(12) United States Patent
Lipowski

(10) Patent No.: US 9,233,376 B2
(45) Date of Patent: Jan. 12, 2016

(54) COMMINUTING DEVICE INCLUDING A ROTARY CURRENT ASYNCHRONOUS MOTOR AND A NON-POSITIVE TRACTION DRIVE AND METHOD FOR ITS OPERATION

(71) Applicant: VECOPLAN AG, Bad Marienberg (DE)

(72) Inventor: Wolfgang Lipowski, Seck (DE)

(73) Assignee: VECOPLAN AG, Bad Marienberg (DE)

( * ) Notice: Subject to any disclaimer, the term of this patent is extended or adjusted under 35 U.S.C. 154(b) by 0 days.

(21) Appl. No.: 14/186,623

(22) Filed: Feb. 21, 2014

(65) Prior Publication Data

US 2015/0174586 A1    Jun. 25, 2015

(30) Foreign Application Priority Data

Dec. 23, 2013   (DE) .......................... 10 2013 114 782

(51) Int. Cl.
*B02C 25/00*    (2006.01)
*B02C 18/24*    (2006.01)
(Continued)

(52) U.S. Cl.
CPC .............. *B02C 25/00* (2013.01); *B02C 18/0084* (2013.01); *B02C 18/24* (2013.01); *H01J 9/52* (2013.01); *H02P 27/06* (2013.01)

(58) Field of Classification Search
CPC   B02C 4/42; B02C 2018/168; B02C 18/0007; B02C 18/24; B02C 18/142; B02C 18/16; B02C 25/00; B02C 18/0084; A24B 7/12; A01F 29/22; H01J 9/52; H02P 27/06
USPC ................................................. 241/30, 101.2
See application file for complete search history.

(56) References Cited

U.S. PATENT DOCUMENTS 2,697,556 A    12/1954   Turner
4,545,539 A *  10/1985   Steffensen ....................... 241/73
(Continued)

FOREIGN PATENT DOCUMENTS

AT        511 908 A1     3/2013
DE   10 2008 061 734 A1  6/2010
DE   10 2008 061 734 A1  6/2010

OTHER PUBLICATIONS

Translation of Wolfgang et al. (DE102008061734A1) Communition device, i.e. Drum Hacker about Rotary Position of Rotor and Rotary Position of Communition Motor and Controlling Drive Device Based on Processed Information.*

(Continued)

*Primary Examiner* — Faye Francis
*Assistant Examiner* — Onekki Jolly
(74) *Attorney, Agent, or Firm* — Alston & Bird LLP

(57) ABSTRACT

A comminuting rotor is driven by a rotary current electric motor via a non-positive traction drive, wherein said rotary current electric motor is energized by a controlled frequency converter for operating the comminuting rotor at a predetermined rotational speed during the normal operating phase. A degree of slip of the traction drive is determined and monitored and the rotary current electric motor is controlled for being powered off if a first slip threshold value is exceeded. If a predetermined second threshold of the traction drive slip is exceeded, which is below said first slip threshold, for continuing the operation of the comminuting device, the frequency converter is controlled in a slip operating phase for a closed or open loop control of the traction drive slip to a predetermined third slip threshold value and for reducing the torque output from the rotary current electric motor.

17 Claims, 3 Drawing Sheets

(51) Int. Cl.
  *B02C 18/00* (2006.01)
  *H01J 9/52* (2006.01)
  *H02P 27/06* (2006.01)

(56) References Cited

U.S. PATENT DOCUMENTS

2005/0061897 A1* 3/2005 Lipowski .................. 241/30
2007/0164139 A1* 7/2007 Lipowski et al. ......... 241/101.2
2008/0223966 A1* 9/2008 Lipowski et al. ......... 241/101.2

OTHER PUBLICATIONS

Office Action for German Application No. 10 2013 114 782.8 dated Sep. 3, 2014.
Extended Search Report from corresponding European Patent Application No. 14190134.8, dated Jun. 2, 2015.
English Translation of Office Action for German Application No. 10 2013 114 782.8 dated Sep. 3, 2014.

* cited by examiner

COMMINUTING DEVICE INCLUDING A ROTARY CURRENT ASYNCHRONOUS MOTOR AND A NON-POSITIVE TRACTION DRIVE AND METHOD FOR ITS OPERATION

CROSS-REFERENCE TO RELATED APPLICATIONS

This application claims priority from German Patent Application No, 10 2013 114 782.8, filed Dec. 23, 2013, which is incorporated by reference herein in its entirety.

BACKGROUND OF THE INVENTION

The invention relates to a method for operating a comminuting device, in which method a comminuting rotor is driven by a driving unit at least comprising a rotary current electric motor, via a non-positive traction drive, in particular a belt drive, wherein said rotary current electric motor is energized by a controlled frequency converter, for operating the comminuting rotor at a predetermined rotational speed during the normal operating phase, and wherein a degree of slip of the traction drive is determined and monitored and the rotary current electric motor is controlled for being powered off if a first slip threshold value is exceeded. The invention also relates to a comminuting device for carrying out such a method.

Such comminuting devices or such a method for operating the same are well known in this field and can be used for a variety of materials to be comminuted, such as wood, domestic waste, industrial waste, production remainders etc. To provide the comminution forces that are required, the output power of the electric motor of such a comminuting device may be several 10 KW up to several thousand kW. Here the material to be comminuted is frequently fed to the comminuting rotor while tools mounted to the comminuting rotor act upon the material to be comminuted. Depending on the construction type, the comminuting rotor rotates at a speed of several revolutions up to several hundred revolutions per minute. Considering that with many kinds of materials to be comminuted the comminution process is not performed in a smooth manner, but may be shock-loaded, the requirements are high concerning the stability of the device and particularly the mounting of the rotating parts.

The use of a non-positive traction drive often turns out to be an advantageous alternative to the gear drive mechanism which, too is frequently used and in which an electric motor is connected to the comminuting rotor via a gear mechanism. Depending on the specific application, mechanical gear mechanisms may produce strong running noises or may lead to a harsh, impact-loaded operation of the comminuting device, accompanied by all relevant drawbacks such as noise, vibrancy, and high loads of individual machine elements. Particularly in the case of jamming caused by the occurrence of uncomminutable extraneous materials, the gear mechanism may be severely damaged and shafts may even break. The use of a non-positive traction drive, particularly a belt drive, disposed between the rotary current motor and the comminution rotor turned out to be advantageous, above all with such comminution process. Such a traction drive is relatively resistant to impact loads and has a damping effect on the entire electro-mechanical drive system. If used in such comminuting devices, said belt drive which otherwise has a number of drawbacks such as its design size and wear characteristics, has the advantage that it slips when extraneous material occurs among the material to be comminuted and thus prevents damage to the drive system. For example, if it is detected in such comminuting devices that slip occurs which exceeds a predetermined slip threshold value, the electric motor may be controlled for being powered off.

A comminuting device of this type as well as a method for operating the same are disclosed for example in the German Offenlegungsschrift DE 10 2008 061 734 A1.

Conventional belt drives for comminuting devices are however subject to considerable wear, which results in comparatively short maintenance intervals that must be observed. Further, the operation of such comminuting devices can be complicated because depending on the material to be comminuted it may require frequent stoppage or reversing of the rotor if comminuting material has accumulated. The interruption of the comminuting process can often not be prevented, even if the feeding rate of the material to be comminuted is reduced. It is therefore an object of the present invention to improve a conventional method for operating comminuting devices of this kind or such a comminuting device in such a manner that the above-described problems are removed at least partially.

SUMMARY OF VARIOUS EMBODIMENTS

Surprisingly, that object is achieved already by a method for operating a comminuting device comprising the features of various embodiments of the present invention. The method of the invention is characterized in that if the amount of a predetermined second slip threshold value of the traction drive is below the first slip threshold value, said frequency converter is controlled in a slip operating phase for controlling the traction drive slip to a predetermined third slip threshold value and for reducing the output torque from the rotary current electric motor, for continuing the operation of the comminuting device.

Due to the fact that in the method of the invention a slip operation is carried out if a second threshold for the traction drive slip is exceeded, during which slip operation a third predetermined slip threshold value for the traction drive slip is selected or controlled either by a simple open loop control or via a closed loop control, it can be achieved that in overload operating phases the load of the traction drive, particularly of the belt drive, is reduced for reducing slip so that wear in the gear mechanism is minimized while the operation of the comminuting device is simultaneously continued without interruption, because compared to prior art methods or devices the slip is "caught" again very quickly or because it can be prevented that the slip increases to an excessive amount or the rotational speed of the comminuting rotor becomes too low.

Preferably, the traction drive slip that has been determined can serve as the variable to be controlled or the control variable, and an output variable of the frequency converter such as the supply current or supply voltage can serve as a control factor or reference value. As a result of the reduced load of the traction drive, the maintenance intervals can be increased and operation of the comminuting device can be continued uninterrupted over operation time periods that have not been achieved before by applying the method according to the invention.

Further essential features of the invention will become apparent from the following general description and from the detailed description with reference to the attached drawing Figures and from the various embodiments of the present invention.

In the method of the invention, the third slip threshold value that can be used as a reference value or control factor can be specifically adjusted for the respective comminuting job.

While the occurrence of a traction drive slip of more than 50%, particularly more than 60% or 70%, advantageously leads to the electric motor being powered off or shut down, it can be advantageous to adjust the second slip threshold value for the traction drive slip slightly higher than the creep (slip by elongation) of approx 1% to 3%, which also occurs at the use of a belt drive and which depends in particular on the specific design of the respective belt and on the belt tension, for example to a slip threshold value in the range of approx 2% to 6%, particularly 3% or 4%. In one embodiment, the second slip threshold value can be determined by the summation of creep and slippage. In another embodiment, only slippage in the belt drive may be applied for adjusting the second slip threshold value within a range of approx 2% to 5%.

By the measure that has been described, the method of the invention can be configured in such a manner that minor slippage is generally allowed within the belt drive during the comminuting operation, without intervention of the control, whereas when a predetermined limit is exceeded, the ongoing operation is interrupted for maintaining a predetermined rotational speed and is switched to a slip control operation during which the predetermined third slip threshold value serves as a reference value or control factor and the motor torque may be reduced. Although the ongoing comminuting operation can be interrupted for maintaining the predetermined rotational speed, an interruption of the comminuting operation per se it is not necessarily required. Accordingly, an uninterrupted comminution operation can be maintained.

For "catching" the slip as reliably as possible and for switching from the slip control operation back to the previous operation at a predetermined rotational speed, it can be advantageous if the third slip threshold value is chosen to be smaller than the second slip threshold value of the traction drive. For example, it can be provided that the third slip threshold value is adjusted to the typical creep of the respective belt drive, which occurs during normal comminution load and at a predetermined setting of the belt tension, or only slightly higher so that during the slip operating phase the reference value or control factor can be initially adjusted to a slippage of approximately or close to 0%.

On the other hand, for minimizing the time duration of the time interval of the slip operating phase, it can be advantageous to adjust the third slip threshold value approximately or precisely to the second predetermined slip threshold value.

Advantageously, it can be provided that during the slip operating phase the torque produced by the rotary current electric motor is reduced by adjusting the supply current or supply voltage by means of the frequency converter so as to reach or fall below the third slip threshold value. Reducing the motor torque in the course of the above-described slip operating phase may be utilized in a beneficial manner for again "catching" the slip of the traction drive, i.e. for adjusting it to below or to the predetermined third slip threshold, so that thereafter the electric motor can be immediately accelerated again before the comminuting rotor has come to a standstill. In this respect, with the method according to the invention, the open loop or closed loop control can automatically adjust the motor to the characteristics of the belt drive, which initially transmits a large torque, then—during overload—suddenly slips and transmits only a small torque until the slip is eliminated again so as to be a predetermined threshold.

By applying the method of the invention, it is possible for a comminuting device which includes a driving system in which an electric motor that is energized via a frequency converter controls a comminuting rotor by means of a non-positive traction drive, particularly a belt drive, to continue its uninterrupted operation in almost any operational situation, without the risk of excessive wear occurring in the traction drive. Advantageously, it can be provided that during the normal operating phase, which is characterized in that a predetermined rotational speed is maintained, an adjustment of the torque produced by the rotary current electric motor to the current comminuting load is effected by the frequency converter by adjusting the supply current or supply voltage of the rotary current electric motor. Advantageously, this normal operating phase at a predetermined rotational speed can be maintained as long as the detected slip in the traction drive does not exceed the second slip threshold and as long as the torque produced by the rotary current electric motor does not exceed a predetermined torque threshold. Expediently, this predetermined torque threshold can be predetermined by the specific construction of the rotary current electric motor and can particularly be a motor parameter.

For keeping the time duration of the slip operating phase as short as possible and in order to provide for a time-optimized response of the open loop or closed loop control to the occurrence of excessive slip of the traction drive if the slip of the traction drive is greater than the second slip threshold, it can be provided that the reduction of the torque output from the rotary current electric motor is effected by a degree that is determined and particularly computed as a function of the detected current value of the slip of the traction drive. It can be particularly advantageous if that degree of reduction of the torque produced by the rotary current electric motor is determined as a predetermined function of the detected current value of slip of the traction drive. Advantageously, that function can be stored in a control unit and can be adjusted to the specific characteristics of the electric motor and/or traction drive. Advantageously, the function can be stored by memorizing a polynomial development representation or supporting points, wherein the latter case involves an interpolation of interim values.

After a stable slip value of the traction drive is reached within the slip operating phase, which is smaller than or equal to the third or second slip threshold value, it can be provided for the torque of the rotary current electric motor being again increased by correspondingly controlling the frequency converter until the predetermined rotational speed is regained and normal operation can be resumed.

Advantageously, it can also be provided that the torque output from the electric motor is then adjusted to a predetermined maximum value, which may correspond for instance to the nominal motor torque. Should again occur an increased slip of the traction drive which exceeds the second threshold, it can also be provided for switching back to the above-described slip operating phase and for storing a reduced maximum torque for the next acceleration phase in order to avoid by a corresponding control of the frequency converter that after the termination of a slip operating phase the slip of the traction drive will again be excessively large as a result of setting an excessive torque. Consequently, the open loop or closed loop control in this embodiment of the invention is capable of automatically adjusting to altered operational conditions caused for instance by the wear of the driving belt or by an altered belt tension.

In operating phases in which the slip of the traction drive is smaller than the second slip threshold, the load of the traction drive can be maintained as a result of the torque provided by the rotary current electric motor. On the other hand, there may be operational situations in which the traction drive is not overloaded, but in which the torque produced by the rotary current electric motor reaches a predetermined upper torque threshold, e.g. the nominal torque. To be able to maintain an optimum comminuting operation adapted to the given circumstances in such operational situations, it can be provided that the normal operating phase at a predetermined rotor speed is followed by a maximum load operating phase in which the torque produced by the rotary current electric motor is kept constant at the predetermined torque threshold or limit by correspondingly controlling the frequency converter, whereby the current rotor speed is reduced relative to the predetermined rotor speed, since that predetermined torque threshold is insufficient for maintaining the predetermined rotor speed.

For maintaining the predetermined rotational speed and thus the normal operating phase during operation, the method of the invention may advantageously provide for the torque of the rotary current electric motor during the maximum load operating phase being kept constant at the predetermined torque threshold by correspondingly controlling the frequency converter until the predetermined comminuting rotor speed is retained, i.e. until the comminuting rotor has been again accelerated to the predetermined rotor speed.

The method of the invention is not limited to those operating modes in which the predetermined rotor speed is constant for the entire operating sequence. Instead, it may also be provided that said predetermined rotor speed changes as a function of time according to a predetermined function, e.g. in the case of a comminuting device in which the required throughput of comminuted material obeys a predetermined time function. This can be the case with a larger plant for instance, such as a power plant, in which the throughput and accordingly the rotational speed of a charcoal comminutor for feeding the power plant furnace are adjusted to the time-dependent electric energy consumption.

Advantageously, for further improving the response behavior of the comminuting device in the case of the occurrence of increased slip of the traction drive, it can provided that the supply current delivered by the frequency converter is used as a reference value or control factor in addition to the slip of the traction drive.

It can be particularly advantageous if the traction drive used for the implementation of the inventive method for operating a comminuting device is not overdesigned, but is instead designed in such a manner that slippage corresponding to the second threshold occurs at a comminution load which preferably corresponds to approx 170%, particularly preferably to approx 200% and most preferably to 230% of the nominal torque. This measure allows for a particularly reliable continuous comminuting process on the one hand and on the other hand for the detection of a malfunction, especially a malfunction caused by uncomminuted extraneous material among the material to be comminuted, so that necessary control measures can be taken for keeping the comminuting process running in almost any operational situation. Concerning the dimensioning of the components and the specifications of the stated operational threshold values, the method of the invention can be configured in such a manner that the comminuting process effectively requires interruption only if the slip exceeds the first threshold, which is equivalent to the detection of obstructing extraneous material.

Advantageously, to be able to perform the open or closed loop control in the inventive method for operating a comminuting device in a time-optimized manner, it can be provided that control signals representative of the speed of the comminuting rotor or the speed of an output-side pulley of the traction drive are received by a control unit and are subject to processing for the determination of the slip in the traction drive, wherein said control unit controls the frequency converter and is provided in particular inside the housing of the frequency transformer. Preferably, the method of the invention is carried out by the control unit of the frequency converter. The short signal propagation delays involved in that measure as well as the time-optimized processing within said control unit allow for an extremely fast response behavior of the open or closed loop-controlled system within the ms or even µs range. Preferably, said control unit may include a storage device for storing predetermined parameters such as slip threshold values and at least one torque threshold, and the method of the invention is carried out on the basis of these parameters.

Preferably, the means for detecting the rotational position of the rotor of the electric motor can be a sensor, particularly a rotary encoder. In principle, any known sensors for rotary position detection can be used, particularly incremental encoders working for instance photoelectrically, magnetically or by means of sliding contacts. However, for the described method the sensor should preferably be particularly highly resolving and have an extremely short response behavior. Normally, a similar or same sensor can be employed for detecting the rotary position or the rotational speed of the comminuting rotor.

It is particularly advantageous if the rotary position of the rotor of the electric motor or its rotational speed is detected without external sensors, particularly without rotary encoders. Most expediently, the current position or speed of the rotor of the electric motor can be determined and particularly computed taking into account at least predetermined motor parameters and/or motor operating parameters. The aforementioned predetermined motor parameters can be determined as an individual set of parameters for the respective electric motor and can be stored in the control unit so as to be available in the determination of the current rotary position or speed of the rotor of the electric motor. Motor operating parameters represent current parameter values during the operation of the electric motor, e.g. phase voltages from which together with the individual set of motor parameters the respective current rotary position or speed of the rotor of the electric motor can be determined so that the provision of an external rotary encoder or a differently configured sensor for the electric motor can be omitted. This approach has advantages particularly for a time-optimized control of the method of the invention.

Preferably, in the present embodiment, the slip in the traction drive can be determined and particularly computed in the control unit on the basis of current parameters of the rotary current electric motor and the signals which are dependent on the rotation speed of the comminuting rotor, and is available for the control in accordance with the invention. Preferably, these sensor signals are transmitted from a sensor device for detecting the rotary position of an output shaft of the traction drive or the rotary position of the comminuting rotor to the control unit.

The object of the present invention is further achieved by a comminuting device including a driving mechanism that comprises at least a rotary current electric motor and drives a comminuting rotor via a non-positive traction drive, wherein the comminuting device is configured for carrying out a method according to invention as described above. The method of the invention can be carried out for example using a comminuting device that comprises a six or eight-pole rotary current asynchronous motor whose stator windings are energized through a controlled frequency converter. The comminuting device can include a comminuting rotor that is driven via a belt drive, said belt drive in the simplest construction having an input-side pulley, which as a rule is fixedly driven by an electric motor, and an output-side pulley. The latter is normally rigidly connected to the comminuting rotor, and both pulleys are coupled in movement by means of a non-positive driving belt.

The driving belt can be constructed as a flat belt or V-belt or composite belt. The belt drive can provide a reduction ratio of approx 1:4 so that a comminuting rotor speed is obtained through the frequency converter in the range of approx 100-400 rpm, particularly 150-300 rpm, at a supply frequency of 50 Hz.

BRIEF DESCRIPTION OF THE SEVERAL VIEWS OF THE DRAWINGS

In the following embodiments of the invention will be described with reference to the attached drawings wherein it is shown by FIG. 1 a schematic diagram of the structure of a comminuting device (1) according to the invention, for carrying out the method of the invention.

DETAILED DESCRIPTION

Figure 1:
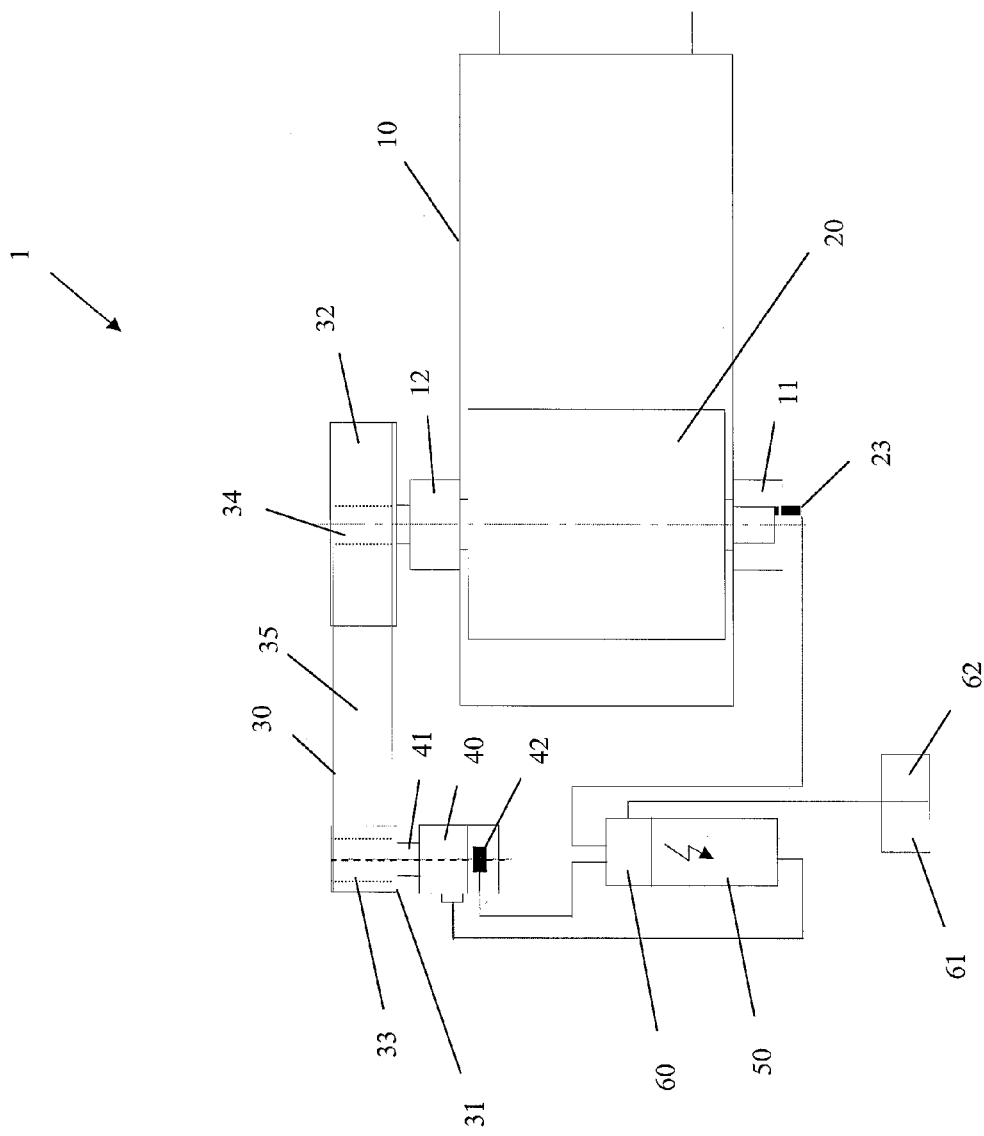

FIG. 1 is a schematic diagram of a comminuting device, which is constructed in accordance with the invention. The comminuting device comprises a housing 10 carrying a comminuting rotor 20 via laterally disposed bearings 11, 12. That comminuting rotor 20 includes a plurality of circumferentially arranged comminuting tools (not shown in the Figure). In the described embodiment, the shaft of the comminuting rotor 20 passes over to the output shaft 34 of a belt drive 34. In the described embodiment, the belt drive is composed of two pulleys 31, 32 that are coupled through a flat belt 35. Pulley 32 on the output side is rigidly coupled to the belt drive output shaft 34 or the rotor shaft of the comminuting rotor 20 and pulley 31 on the input side is rigidly coupled to the belt drive driving shaft 33, which in the described embodiment is in turn rigidly connected to the rotor 41 of the rotary current asynchronous motor 40. The motor 40 thus drives the comminuting rotor 20 via the above-described belt drive 30, for comminuting material to be comminuted. In the described embodiment, the electric motor is designed as an eight-pole rotary current asynchronous motor rated at 100 kW so that a motor nominal rotational speed of 750 rpm is obtained at a supply of 50 Hz. The belt drive itself has a reduction ratio of 1:4, which results in a rotor speed of approx 190 rpm at a supply of 50 Hz. For the implementation of the operating method of the invention, the power to the rotary current asynchronous motor 40 is supplied through a frequency converter 50, which is controlled by an associated control unit 60 that is arranged in the housing of the frequency converter. The frequency converter is particularly configured for outputting an adjustable or controllable rotary current supply voltage with a variable frequency. For the sake of convenience, the rotary current supply of the frequency converter via public mains is not shown.

In the described embodiment, the comminuting device is operated at rotation speeds of typically 150-300 rmp approximately, depending on the material to be comminuted. A highly resolving rotary encoder 23 is attached to the shaft of the comminuting rotor 20. In the embodiment illustrated in FIG. 1, a highly resolving rotary encoder 42 is additionally attached to the rotor 41 of the electric motor 40. Both sensors are connected on the output side thereof to the control unit 60 of the frequency converter 50, for detecting the slip in the belt drive 30 by comparing the rotational speed of the motor shaft 41 and the comminuting rotor 20 corresponding to the rotation speed difference between the input-side pulley 31 and the output-side pulley 32 of the belt drive 30.

FIG. 1 further shows an input device 62 in the form of a keypad as well as an output device 61 in the form of a display, for inputting specific operating parameters for adjusting the operation of the comminuting device to the respective material to be comminuted, particularly by setting specific operating parameters.

A further embodiment of the comminuting device of the invention can also be provided for the detection of the rotary position or the rotational speed of the rotor of the electric motor without the use of an external sensor. For example, the current rotary position of the rotor of the electric motor can be determined by the control unit while taking into account predetermined motor parameters and/or motor operating parameters. The stated predetermined motor parameters can be determined as an individual set of parameters for the respective motor and stored in the control unit 60 so as to be available during the operation of the comminuting device of the invention, for the determination of the current rotary position or rotary speed of the rotor of the electric motor. Motor operating parameters represent current parameter values during the operation of the electric motor such as phase voltages from which together with the individual set of motor parameters the respective current position or current rotation speed of the rotor of the electric motor can be determined. Accordingly, in the present embodiment, solely a highly resolving rotary encoder 23 is used for the detection of the rotary position or rotational speed of the comminuting rotor. The rotation speed difference or the slip in the belt drive 30 is then determined on the basis of the signals from that rotary encoder and the motor operating parameters.

Due to its described construction, the belt drive 30 may involve slip, i.e. the pulleys 31, 32 may slide relative to the belt 30, depending on the operating conditions, so that both pulleys are not in a fixed rotational relationship to each other. The occurrence of such slippage is particularly dependent on the dimensioning of the belt drive and on the respective loads, especially impact loads, during the comminuting process. It turned out to be useful for the implementation of the method for operating a comminuting device if the transmission mechanism is designed in such a manner that under usual operating conditions such as a warmed-up belt and a prescribed belt tension, it affords a slip-free transmission of approximately 1.8 to 2.5 times and particularly preferably approximately two times the nominal torque of the rotary current asynchronous motor 40. With the belt drive being constructed in this manner, situations with elevated slippage during the comminuting process will arise again and again so that the inventive method for operating a comminuting device can be implemented exceptionally effectively and efficiently. That method allows a continuous comminuting process that frequently avoids steps like reversing the drive mechanism or reducing the feed rate of the material to be comminuted, which constitute compulsory measures in conventional methods using conventional devices.

Figure 2:
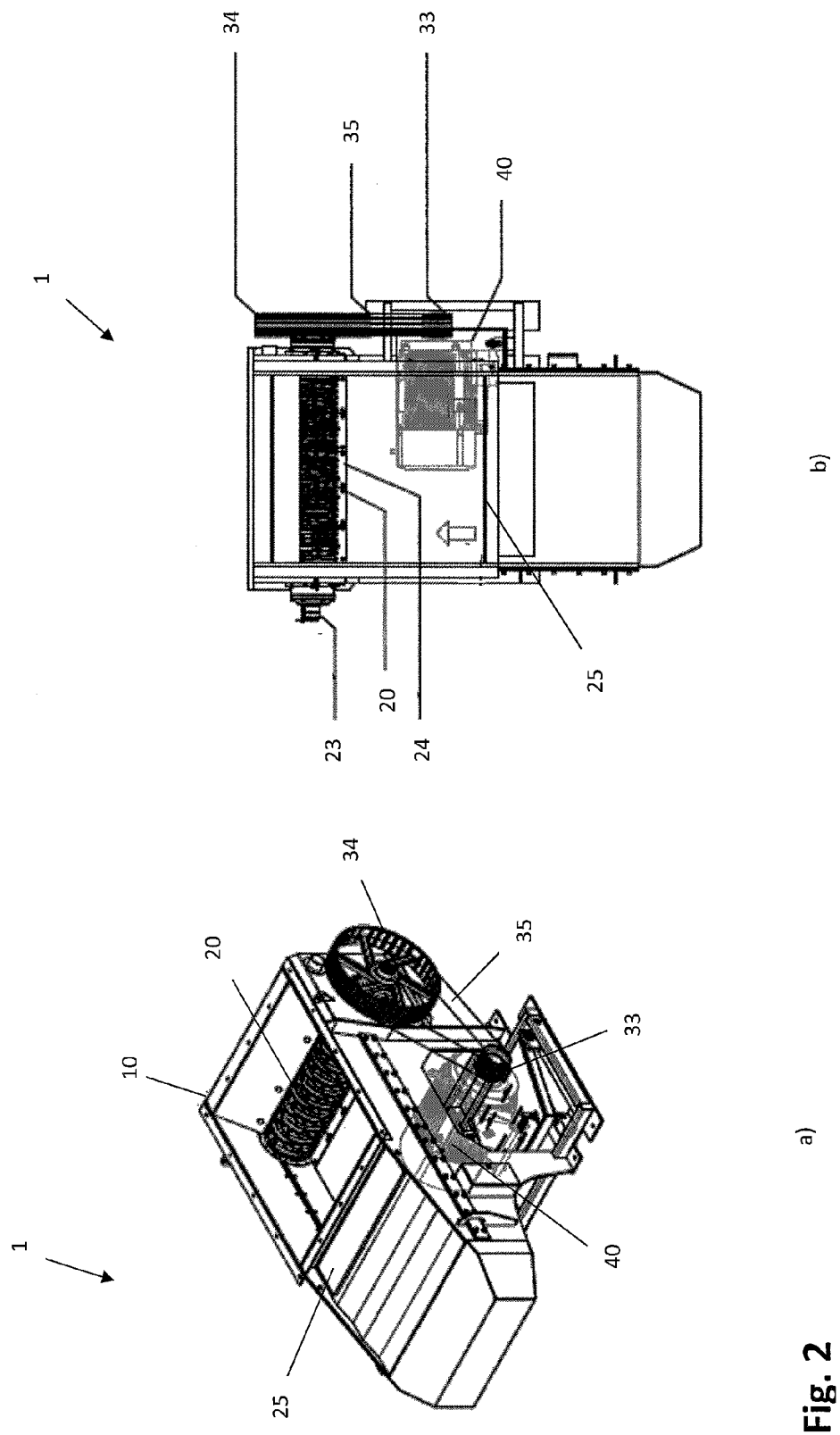
FIGS. 2a, b a comminuting device (1) having a similar structure as in FIG. 1, in a perspective, real or top view.

The FIGS. 2a, b show illustrations of a real design of a comminuting device constructed in accordance with the invention, for the implementation of the operating method of the invention. In these Figures, components similar to those illustrated in the schematic diagram of FIG. 1 are identified by similar reference signs. For feeding the material to be comminuted, the device according to the FIGS. 2a, b comprises a feeder 25, which is horizontally movable with respect to the comminuting rotor 20. Also seen is counter knife 24, which cooperates with comminuting tools circumferentially disposed on the comminuting rotor 20, for comminution.

The inventive method for operating a comminuting device will be described in the following with reference to FIG. 3, which shows the variation in time of different operating parameters for a particular operating time. In the embodiment here described, typical open loop or closed loop control timing is very short and within a range of just a few milliseconds or less so that a reaction to usually suddenly occurring slip in the belt drive is possible with an extremely short reaction time. For this purpose, delays of signal propagation, particularly of the sensors 23, 42, to the control unit 60 are minimized. Further, the control unit 60 is configured for fast information processing and for fast control of the frequency converter 50. In this respect, slip monitoring devices as usually employed are too slow for maintaining a normally continuous comminuting process in accordance with the invention.

Moreover, in the described embodiment, the components of the comminuting device of the invention, particularly the electrical components of the open or closed loop-controlled system are chosen in such a manner that the below-described operational situations can be quickly determined, evaluated, and adjusted for an alteration of supply parameters such as current or voltage within a response time of approx 1-2 ms or less, thus almost always avoiding a downtime of the comminuting rotor 20. Frequent downtimes of the comminuting rotor as with conventional comminuting devices involve a problem in that a restart under load, which is due to material to be comminuted being present in the device, is often prevented.

Before starting the operation, operating parameters depending on the material to be comminuted are input via the input device 62, parameters such as a desired set rotation speed $\omega 0$ of the comminuting rotor, a first slip threshold value S1 of the traction drive intended for discerning uncomminutable extraneous material, a second slip threshold value S2, which is considered as the admissible deviation of the rotational speed difference or slip in the operation of the comminuting device, a third slip threshold value S3, which is considered as the admissible deviation of the rotational speed difference or slip in the slip operating phase of the comminuting device, and a motor torque limit MG, which indicates the maximum torque output of the motor. The latter may be in particular the nominal torque of the motor. These parameters are stored in the control unit 60 of the frequency converter 50. In the described embodiment, the second and the third slip threshold values S2, S3 are set at identical values.

Figure 3:
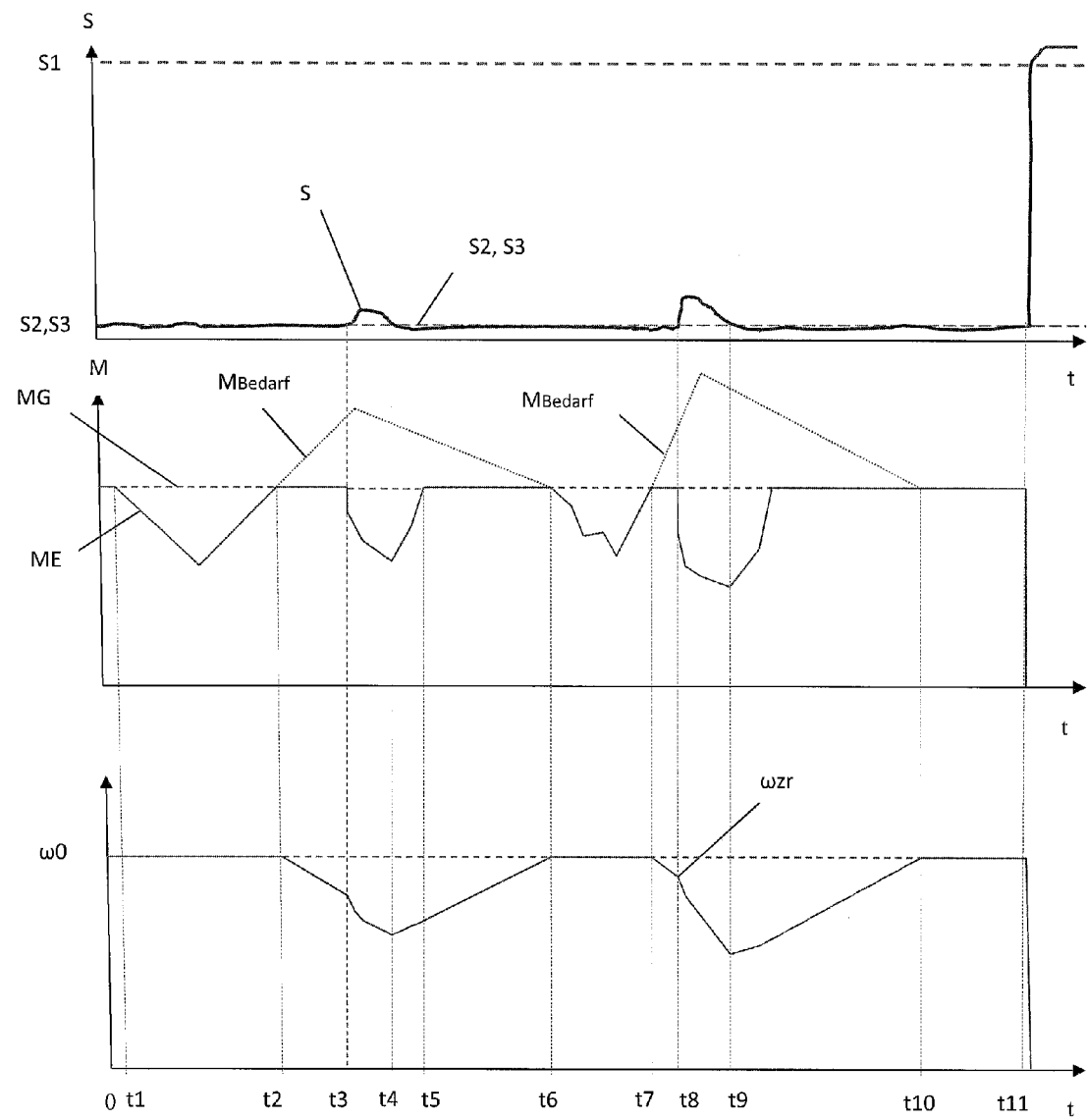
FIG. 3 diagrams of variation in time of different operating parameters over different operational situations.

FIG. 3 shows the variation in time of the traction drive slip S, the motor torque M, and the current rotational speed $\omega zr$ of the comminuting rotor. In the described embodiment, the slip S is determined by calculating the rotational speed difference $\omega E - \omega zr$ divided by $\omega E$, wherein $\omega E$ is the rotational speed of the electric motor and $\omega zr$ is the rotational speed of the comminuting rotor, corresponding to the rotational speeds of the input-side or output-side pulley of the belt drive 30.

As shown by the upper graph in FIG. 3, the determined slip S remains below the second slip threshold S2 within the time interval of t=0 until t=t2 so that the control is able to maintain a normal operating phase in which the predetermined rotor speed $\omega 0$ is maintained, which is reflected in the horizontal gradient of the rotational frequency $\omega zr$ of the comminuting rotor in the third curve. The graph in the middle initially shows the preselected torque limit MG in a broken line, which presents itself as a horizontal line. As can be seen from the gradient of the current torque ME output from the motor, the comminuting load of the motor is lower than the predetermined motor torque limit MG within the time interval t1 to t2 so that within that period the motor torque decreases and subsequently increases again, depending on the load, until it regains the predetermined motor torque limit MG at time t2. The period between t1 and t2 can be seconds or minutes, depending on the operational situation.

After t2, for maintaining the preselected rotational speed $\omega 2$ of the comminuting rotor, the torque should continue to increase, since the load further increases due to the comminuting process. This further, theoretical increase in the torque is shown dotted in the graph and is attached the reference sign MBedarf. As maximally the torque limit MG can be output, the rotational speed of the comminuting rotor decreases between time t2 and t3, see the lower curve of FIG. 3. Also the period between t2 and t3 can be seconds or minutes, depending on the operational situation.

At time t3, the slip increases beyond the threshold S2 and remains above that value until time t4. To avoid that the belt of the belt drive 30 continues to slip, the control unit 60, for reducing the torque output of the electric motor 40, switches to a slip operating phase, in which the traction drive slip is controlled to the third slip threshold S3, which is identical with the second threshold S2, in an open loop in the described embodiment and in a closed loop in a further embodiment. To this end, the control unit 60 lowers the torque limit from the predetermined torque limit MG until the slip S re-adjusts to or to below the threshold S2. This is the case at time t4, so that the motor torque ME can then be increased again, in the present case up to the predetermined torque limit MG at time t5. The duration of the time interval between t3 and t4 is within the range of milliseconds, which is due to that very fast open loop or closed loop control timing, so that it is possible to frequently maintain a continuous comminuting process without interruptions of the comminution for the purpose of reversing or decelerating feeding of the material to be comminuted, despite the occurrence of the increased slip below threshold S1.

After the slip S has again decreased to or to below threshold S2, the control can switch back to the operating phase in which the slip does not exceed threshold S2. Since the belt is "caught" again at time t4, the motor torque ME is again increased to the preset motor torque limit MG. Also the duration of the time interval between t4 and t5 can be within the range of milliseconds, without any inadmissibly large slip occurring in the belt drive which would cause the motor being powered off.

The following interval until time t6 is used for returning the rotational speed of the comminuting rotor to the preset rotational speed $\omega 0$. For this purpose, the output motor torque ME is maintained at the predetermined torque limit MG, whereby the comminuting rotor is accelerated. After reaching the predetermined nominal rotation speed $\omega 0$, a reduced motor torque ME is required for maintaining said nominal rotation speed, said rotor torque being decreasing between time t6 and time t7 and thereafter increasing again.

As explained above, the time intervals between time t3 and t4, t4 and t5 or t8 and t9 (see below) can be within the range of milliseconds. While the torque reductions in these time segments are in fact within a range of 50% or more, the torque reductions displayed in the third graph are rather small within these short periods and are shown exaggerated in said graph, for reasons of clarity.

In the operating sequence described in FIG. 3, an increased slip S again occurs at time t8, which slip is above the predetermined limit S2. According to the invention, in the described embodiment, switching to the slip operating phase takes place within time interval t8 to t9, and in that slip operating phase an open or closed loop control of the traction drive slip is performed under reduction of the motor torque ME output from the asynchronous motor 40. In this context, a functional relation of the quantity of reduction of the torque ME produced by the asynchronous motor as a function of the detected current value of the traction drive slip S is stored in the control unit 60, which function is used by the control unit for computing the torque reduction. Here a stronger reduction of the torque is effected, because there has been detected a slip S which is increased compared to the situation within time interval t3 to t4.

Within the phase t3-t4 or t8-t9, in which slip occurs which is above the second threshold S2, the motor torque is controlled downwards in an open or closed loop on the one side and on the other side the centrifugal moment of the comminuting rotor is utilized for the actual comminuting process at these time segments. The simultaneously occurring reduction of the rotational speed leads to the belt being "caught" as described, so that thereafter the slip operating phase can be left and the motor torque ME increased again, for selecting the predetermined nominal rotational speed of the comminuting rotor.

After time t9, the torque is again continuously increased and utilized for accelerating the comminuting rotor to the predetermined rotational speed ω0, which is reached at time t10.

Between time t10 und t11, the preset rotational speed ω0 can be maintained in the normal operating phase while the maximum motor torque MG is produced.

At time t11, sudden occurrence of a slip S is detected, which exceeds slip threshold S1 of presently approx 50% that has been input in advance and in which uncomminutable extraneous material is discerned. Due to the short reaction time, the motor torque is instantly reduced, and in a corresponding manner the rotational speed of the comminuting rotor quickly decreases until stoppage.

Differently from the operating sequences described in context with FIG. 3, it can also be provided for the open or closed loop control in a slip operating phase being set in such a manner that after decreasing the slip S to below the threshold S2, the motor torque is gradually increased to the predetermined motor torque limit not in several steps or with a finite incline, but the torque output from the asynchronous motor is instead suddenly increased to the predetermined motor torque limit after the slip has decreased to below the said limit. Should in this case again occur an increased slip above the limit S2, the motor torque would be reduced anew.

The invention claimed is:

1. A method for operating a comminuting device, in which method a comminuting rotor is driven by a driving unit which comprises at least a rotary current electric motor, via a non-positive traction drive, wherein said electric motor is energized by a controlled frequency converter, for operating said comminuting rotor at a predetermined rotational speed (ω0) during a normal operating phase, and wherein a degree of slip (S) of the traction drive is determined and monitored and the rotary current electric motor is controlled for being powered off if a first slip threshold value (S1) of the traction drive slip is exceeded, wherein if a predetermined second threshold (S2) of the traction drive slip is exceeded, which is below said first slip threshold (S1), said frequency converter is controlled in a slip operating phase for closed or open loop control of the traction drive slip (S) to a predetermined third slip threshold value (S3) and for reducing the torque (ME) output from the rotary current electric motor.

2. The method according to claim 1, wherein the third traction drive slip threshold (S3) is lower than or equal to the second traction drive slip threshold (S2).

3. The method according to claim 1, wherein during the slip operating phase, the torque (ME) produced by the rotary current electric motor is reduced to or to below the third slip threshold value (S3) by controlling the frequency converter.

4. The method according to claim 3, wherein after reaching the third slip threshold value (S3), the frequency converter is controlled without any time lag, for supplying the rotary current electric motor in such a manner that the motor outputs a torque (ME) which is equal to a predetermined upper torque limit (MG).

5. The method according to claim 1, wherein an adjustment of the torque (ME) produced by the rotary current electric motor to the current comminution load is made by the frequency converter during the normal operating phase at the predetermined rotational speed (ω0) by means of energizing the rotary current electric motor.

6. The method according to claim 1, wherein the normal operating phase is maintained at the predetermined rotational speed (ω0) as long as the detected slip (S) in the traction drive does not exceed the second predetermined slip threshold (S2) and the torque (ME) produced by the rotary current electric motor does not exceed an upper torque limit (MG).

7. The method according to claim 1, wherein the reduction of the torque (ME) output from the rotary current electric motor is made by a degree that is determined and particularly computed as a function of the detected current value of the traction drive slip (S).

8. The method according to claim 7, wherein the degree of reduction of the torque produced by the rotary current electric motor is computed as a predetermined function of the detected current value of the traction drive slip (S).

9. The method according to claim 1, wherein after a stable slip value (S) of the traction drive is reached during the slip operating phase, which slip value is smaller than or equal to the third slip threshold value (S3), the torque (ME) of the rotary current electric motor is again increased by correspondingly controlling said frequency converter until the predetermined comminuting rotor speed (ω0) is retained and normal operation resumed.

10. The method according to claim 1, wherein the normal operating phase at the predetermined rotational speed (ω0) of the comminuting rotor is followed by a maximum load operating phase if the detected slip (S) in the traction drive does not exceed the second predetermined slip threshold (S2) and if the torque (ME) produced by the rotary current electric motor reaches a predetermined torque threshold (MG), wherein during the maximum load operating phase the torque (ME) produced by the rotary current electric motor is kept constant at the predetermined torque threshold (MG) by correspondingly controlling said frequency converter, whereby the rotor speed (ωzr) decreases compared to the predetermined rotational speed (ω0).

11. The method according to claim 10, wherein during the maximum load operating phase, the torque (ME) of the rotary current electric motor is kept constant at the predetermined torque threshold (MG) by correspondingly controlling the frequency converter until the predetermined rotational speed (ω0) is retained and the normal operating phase resumed.

12. The method according to claim 1, wherein a control unit for controlling said frequency transformer is provided and is disposed inside the housing of said frequency transformer, wherein the frequency transformer comprises a storage device for storing a number of predetermined operating parameters and wherein a number of sensor signals, which depend on the rotational speed of the comminuting rotor, are received by said control unit and are processed for determination of the slip (S) in the traction drive.

13. The method according to claim 12, wherein in said control unit, the slip (S) in the traction drive is determined and computed on the basis of current operating parameters of the rotary current electric motor and the signals that are dependent on the rotational speed of the comminuting rotor.

14. The method according to claim 12, wherein the sensor signals are transmitted from a sensor device for detecting the rotary position of an output shaft of the traction drive or the rotary position of the comminuting rotor to said control unit.

15. A comminuting device, comprising a driving device which at least includes a rotary current electric motor and drives a comminuting rotor via a non-positive traction drive, wherein the comminuting device is arranged for carrying out a method
wherein said electric motor is energized by a controlled frequency converter, for operating said comminuting rotor at a predetermined rotational speed ($\omega 0$) during a normal operating phase, and wherein a degree of slip (S) of the traction drive is determined and monitored and the rotary current electric motor is controlled for being powered off if a first slip threshold value (S1) of the traction drive slip is exceeded, wherein if a predetermined second threshold (S2) of the traction drive slip is exceeded, which is below said first slip threshold (S1), said frequency converter is controlled in a slip operating phase for closed or open loop control of the traction drive slip (S) to a predetermined third slip threshold value (S3) and for reducing the torque (ME) output from the rotary current electric motor.

16. The method according to claim 12, wherein the number of predetermined operating parameters comprise slip threshold values (S1, S2, S3).

17. A comminuting device according to claim 16, wherein the driving device drives a comminuting rotor via a belt drive.

* * * * *